March 27, 1962 P. E. GAUDRY 3,027,475
STATOR FOR DYNAMO-ELECTRIC MACHINES AND TOOL
FOR WINDING COILS THEREON
Filed April 1, 1958 6 Sheets-Sheet 1

INVENTOR
Paul Emile Gaudry
BY
his ATTORNEY

March 27, 1962  P. E. GAUDRY  3,027,475
STATOR FOR DYNAMO-ELECTRIC MACHINES AND TOOL
FOR WINDING COILS THEREON Filed April 1, 1958  6 Sheets-Sheet 2

INVENTOR
Paul Emile Gaudry
BY
ATTORNEY

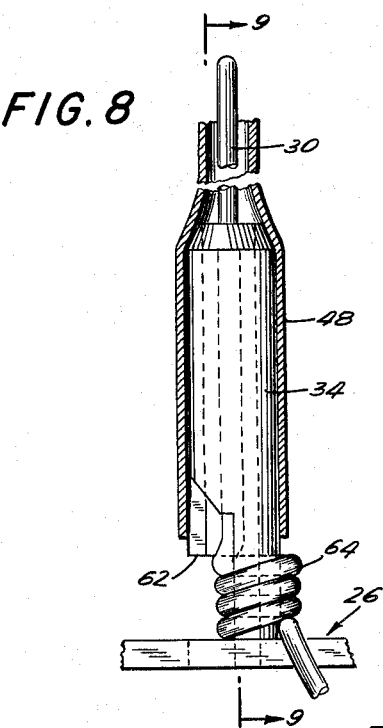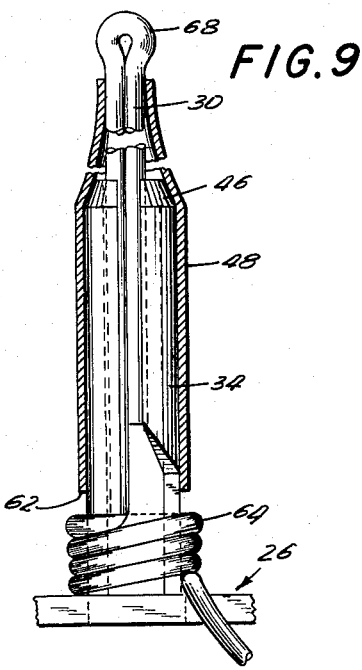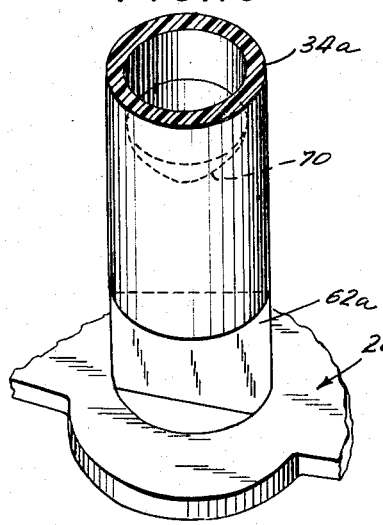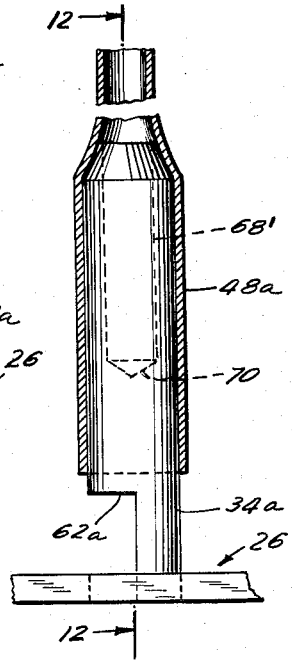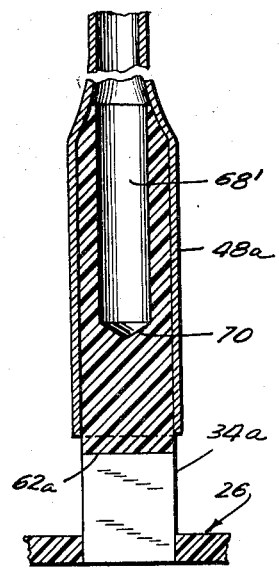

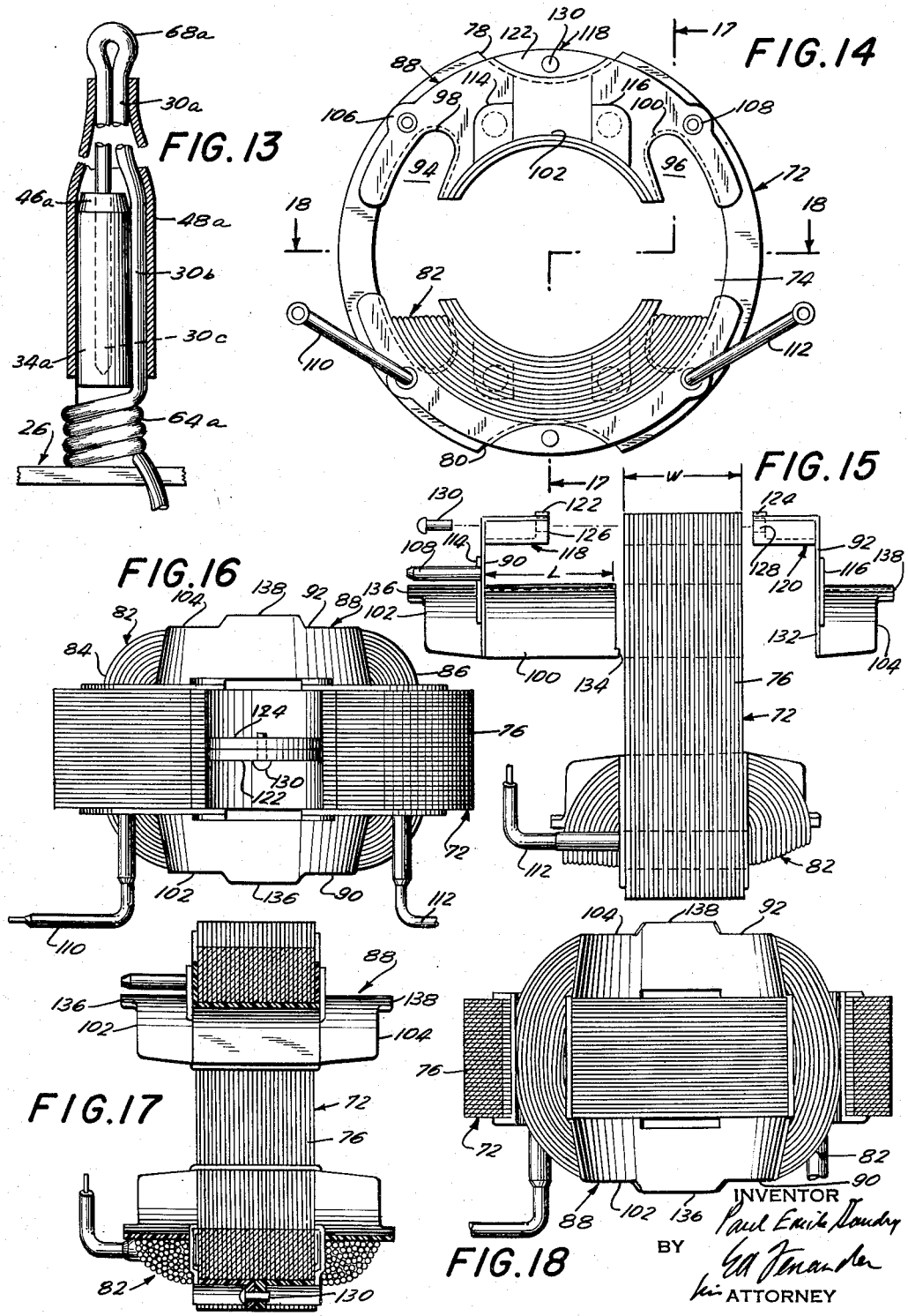

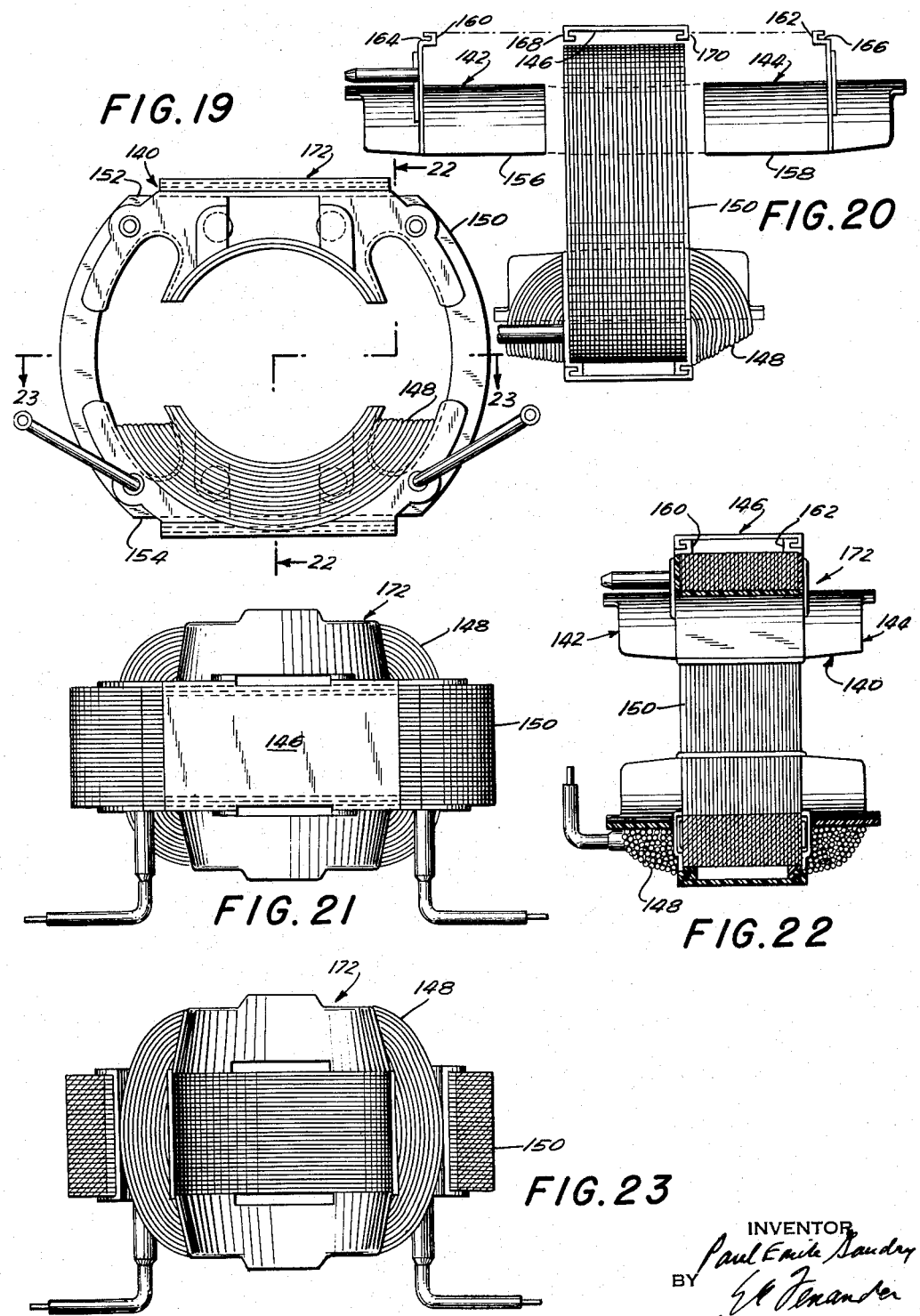

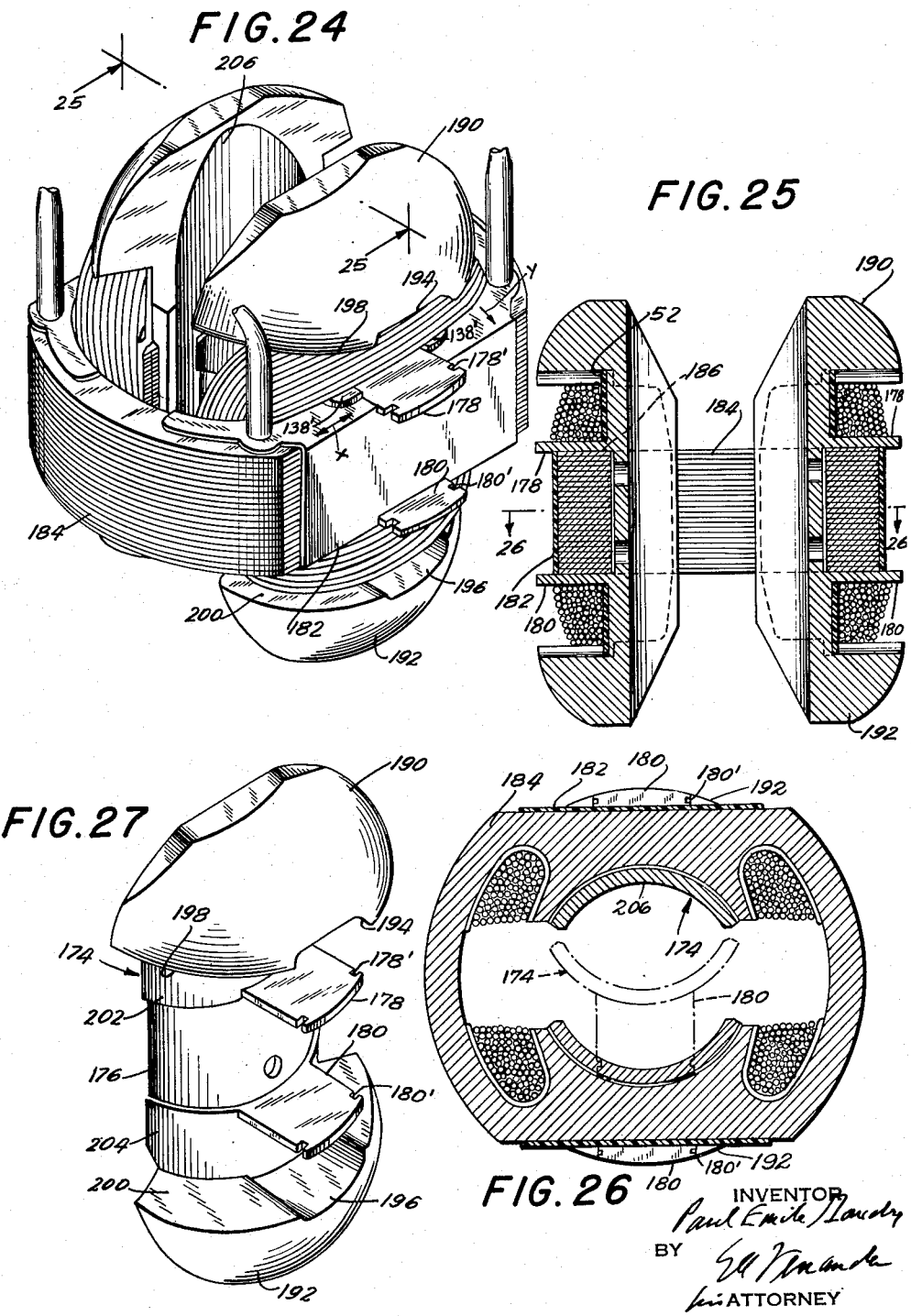

United States Patent Office 3,027,475
Patented Mar. 27, 1962

3,027,475
STATOR FOR DYNAMO-ELECTRIC MACHINES AND TOOL FOR WINDING COILS THEREON
Paul Emile Gaudry, Montreal, Quebec, Canada, assignor to Aktiebolaget Electrolux, Stockholm, Sweden, a corporation of Sweden
Filed Apr. 1, 1958, Ser. No. 725,716
20 Claims. (Cl. 310—260)

This invention relates to insulating arrangements for coils and cores in stators for dynamo-electric machines and further relates to devices pertaining to terminal arrangements for electrical conductors.

In stators for dynamo-electric machines, it is the practice to insulate a coil from the core on which the coil is to be mounted.

It is an object of the invention to provide an improved insulating device for mounting a coil on a core so as to fix the coil relative to the core and simultaneously provide an insulation therebetween. The invention effects this purpose by providing an insulating device which is adapted for enveloping a core or core section in the manner of a sheath and which includes accommodations for locking the coil in fixed position.

The winding of a coil and its subsequent positioning on a core are normally two separate operations.

It is, however, an object of the invention to provide improved insulating devices whereby a coil can be conveniently wound directly on a core.

In the winding of a coil directly on a core, with an insulating device therebetween, the inherent resiliency of the coil material may result in a subsequent expansion which might cause the coil to escape from its accommodations on the insulating device.

It is, accordingly, a further object of the invention to provide improvements to account for the above noted expansion in order to maintain the coil in desired position.

The ends of a coil in a stator for a dynamo-electric machine are frequently subjected to tensile or pulling forces such as might dislodge the coil from its most favorable position relative to an associated core.

Accordingly, it is another object of the invention to provide improved arrangements for preventing mechanical forces applied to the terminal portions of a coil from being transmitted to the coil itself. To achieve this objective, the invention contemplates an arrangement whereby the terminal portions of a coil are anchored to posts mounted on or integral with the aforenoted insulating device.

Moreover, the terminal portion of a coil need necessarily be conveniently available for connection to a source of electrical power. Consequently, these terminal portions are generally of such a length as to enable a free movement which, due to possible short circuits, is both harmful and dangerous.

It is therefore another object of the invention to provide for supporting these terminal portions in such a manner as to avoid undesirable displacement.

Additionally, cores usually vary in thickness due to lamination tolerances and the like. Consequently, where an insulating device need fit with any degree of precision on a core, the problem is presented of making the insulating device adaptable over a range of core thickness.

Thus, another object of the invention is to provide improved insulating devices capable of accommodating varying core sizes.

Further objects and advantages of the invention will be found in the following detailed description of various embodiments thereof as illustrated in the accompanying drawing in which:

FIGURE 8 is a sectional view taken along line 8—8 of FIGURE 1 and illustrates a terminal post with the terminal portion of the associated coil wrapped thereupon;

FIGURE 9 is a view taken along line 9—9 of FIGURE 8;

FIGURE 10 is a partial view, in perspective, of a second embodiment of a terminal post provided in accordance with the invention;

FIGURE 11 is an axial section of the terminal post illustrated in FIGURE 10;

FIGURE 12 is a sectional view taken along line 12—12 of the terminal post illustrated in FIGURES 10 and 11;

FIGURE 13 illustrates how the terminal post of FIGURES 10–12 is operatively associated with the terminal portion of a coil;

FIGURE 14 is a side view of a core and coil assembly in which is used an insulating device in accordance with a further embodiment of the invention;

FIGURES 15 and 16 are respectively end and top views of the arrangement of FIGURE 14;

FIGURE 17 is a sectional view along line 17—17 of FIGURE 14;

FIGURE 18 is a sectional view along line 18—18 of FIGURE 14;

FIGURE 19 is a side view of a core and coil assembly using a third type of insulating device;

FIGURE 20 is a partially exploded end view of the arrangement of FIGURE 19 showing the insulating device in sections;

FIGURE 21 is a top view of the arrangement of FIGURE 19;

Figure 1:
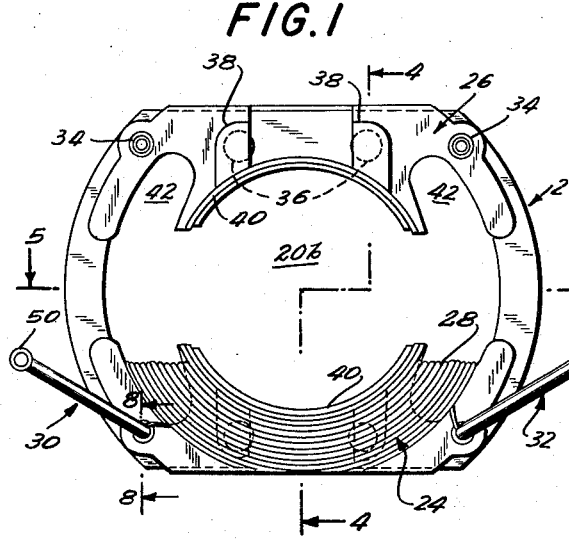
FIGURE 1 is a front elevational view of a stator core and coil arrangement including two insulation elements in accordance with a first embodiment of the invention, the upper insulating element having no coil provided thereupon to facilitate an understanding of its construction.

FIGURES 22 and 23 are, respectively, sectional views along lines 22—22 and 23—23 in FIGURE 19;

FIGURE 24 illustrates apparatus and a method for providing an assembly in accordance with the invention;

FIGURE 25 is a sectional view along line 25—25 in FIGURE 24;

FIGURE 26 is a sectional view along line 26—26 in FIGURE 25; and

FIGURE 27 illustrates a portion of the tool shown in FIGURE 25.

In FIGURES 1–5 is shown a stator core and coil arrangement including a magnetic field structure 20 consisting of a lamination of layers of magnetic material 22, a coil 24 and an insulating element or device 26. The magnetic field structure 20 comprises a yoke and inwardly extending pole pieces which terminate in concave-shaped pole faces defining a bore 20b adapted to receive a rotor. The pole pieces are formed with leading and lagging tips which are spaced from the yoke to provide wall surfaces defining spaces 42 of U-shape.

As is known, the coil 24 is adapted to be connected to a source of electrical power and creates a field which magnetically affects the core 20, the insulating element or device 26 functioning to insulate the coil 24 from the core 20 so as to avoid electrical continuity therebetween and the device 26 moreover supporting the coil 24 in a predetermined and most favorable relationship to the core.

The coil 24 consists of a number of turns or windings 28 which terminate at the extremes of the coil in terminal portions 30 and 32. The insulating element or device 26 not only provides for the proper positioning of the coil 24 but moreover provides for anchoring and guiding the terminal portions 30 and 32 of coil 24 in such a manner that these terminal portions are readily available for connection to a source of electrical power while being at the same time guarded from undesirable contacts with the core 20 or the coil 24.

For this purpose, there is provided at each of a number of positions on the insulating element 26 a post 34 which is preferably a hollow tubular member, hereinafter described in greater detail. It is a function of each post 34 to accommodate the terminal portions of the associated coil and to provide for guiding these terminal portions to a position from which they may freely extend without danger of contacting the core or coils as noted above. Moreover, as will hereinafter be explained in greater detail, it is a function of the posts 34 to provide means whereupon the terminal portions of the coil can be anchored in such a manner that tensile forces applied at the end portions of the coils are not transmitted to the bodies of the coils which might be displaced thereby from their most favorable positions.

The layers 22 which constitute the lamination of the core 20 are generally held together by external means such as the bolts 36. The bolts 36 generally extend beyond the surfaces of the core and present irregularities therein. In order to provide for an intimate engagement or fit between the core 20 and the insulating device 26, the latter is preferably provided with elevated portions or recesses 38 which are designed and have a configuration suitable for accommodating the heads of the various bolts 36.

It will be noted, particularly in FIGURE 1, that the coil 24 is provided with a cross-section which is generally arcuate in nature. Due to this configuration of the coil 28 which is intended to be supported within a peripheral portion of the core 20 which is generally circular in shape, the insulating device 26 is provided with an arcuate extension or wall 40 at either side of the core 20. Preferably the shape of the wall 40 is adapted to engage intimately with the inner arcuate surface of the associated coil.

The transverse ends of the coil 24 cross through the central opening of the core 20. To accommodate these ends of the coil 24, the lateral extremes of the insulating device 26 are provided with U-shaped sections overlying the wall surfaces of the magnetic field structure defining the spaces 42. From the U-shaped sections extend walls which are correspondingly U-shaped and which are affixed to or integral with the insulating device 26 at the perimeter of these recesses 42.

These latter walls 44 each extend for substantially one-half of the thickness of the core 20 so as to meet or closely approach one another at the center of the opening of the core 20 so as to provide a good foundation for the support of the associated coil 24.

It is to be noted from the various figures that the walls 40 and 44 are so spaced and positioned that the thickness of the associated coil 24 is snugly accommodated therebetween. As a consequence of this arrangement, the coil 24 is rather rigorously maintained in position with regard to the recesses 42 and the walls 44 by means of the associated wall 40. It is therefore virtually impossible for the coil 24 to be displaced and its position is predetermined in accordance with electrical principles so as to effect a most favorable coupling between itself and the core 20.

Figure 3:
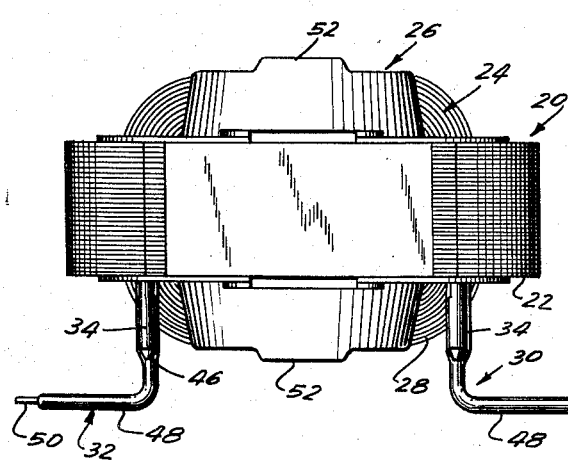
FIGURE 3 is a top plan view of the arrangement of FIGURE 1.
Figure 4:
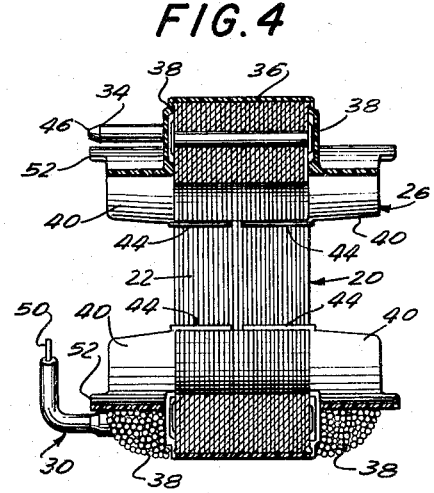
FIGURE 4 is a vertical cross-section taken along line 4—4 of FIGURE 1, this view illustrating how the insulation element is formed to provide clearance for irregularities on the surface of the core.

As previously indicated terminal posts 34 are provided on the insulating device 26 for purposes of anchoring and otherwise positioning the terminal portions of the coils. In FIGURE 3, is particularly indicated the provision of a tapered portion 46 at the outermost extreme of each of the posts 34. The tapered portions 46 enable the guiding over the posts 34 of insulating sleeves 48 which are intended to provide insulation for the terminal portions of a coil which extend beyond the posts 34.

It will be moreover noted that the extremes of the coils are provided with eyelets 50 which adapt the coil ends for ready connection to a source of electrical power. The anchoring of the coil terminal portions to the posts 34, as well as the provision of the eyelets 50 and the insulating sleeves 48 constitute a feature of the invention which will hereinafter be explained in greater detail.

It is also to be noted in FIGURES 1-5 that the walls 40 of the various insulating devices 26 are provided with extensions 52. The extensions 52 are intended to facilitate the winding of the coils on the associated insulating devices while at the same time affording extra protection and insurance against displacement of the associated coils from their respective insulating elements.

Figure 2:
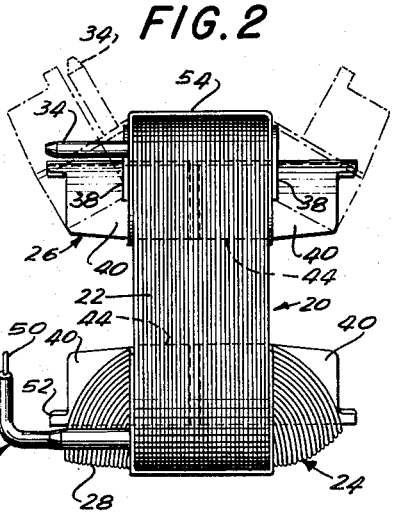
FIGURE 2 is an end elevational view of the structure shown in FIGURE 1 with a showing in dot and dash lines of an intermediate folded position of the upper insulation element.

With brief reference to FIGURE 2, and particularly to the portion thereof illustrated in dash and dot lines, it will be noted that insulating devices 26 are not directly molded on the core 20. Instead, an insulating device 26 consists of various hinged portions and walls such that when the insulating device 26 is properly folded about the core 20 or a peripheral portion thereof, it effectively constitutes an insulating sheath. To facilitate this folding action, the insulating device 26 is provided with notches or grooves 54 which enable the device 26 to be readily folded.

Figure 6:
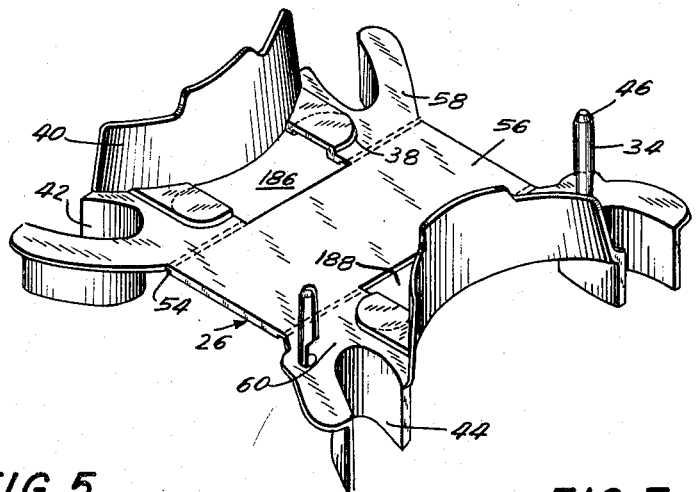
FIGURE 6 is a perspective view of the insulation elements in unfolded condition.

FIGURE 6 illustrates in perspective, an insulating device 26 which has not yet been folded so as to be able to straddle an associated core 20. As indicated above, the insulating device 26 includes arcuate walls 40 and U-shaped recesses 42 which determine the shapes of associated walls 44. Moreover, the insulating device 26 includes elevated portions 38 which in the described device are four in number, although the number and shapes of these elevated sections can be changed to accommodate irregularities in the various types of cores with which such insulating devices may be associated. Moreover, included in the insulating device 26 are the posts 34 with their tapered outer extremes 46.

As was briefly indicated above, the insulating device 26 consists of hingeably attached sections. In fact all of the elements described above as being associated with the insulating device 26 are integral and the insulating device 26 may be molded of an insulating material such as nylon or an equivalent plastic material. The insulating device 26 is preferably molded as a single integral piece in which are provided notches or grooves 54 which divide the single piece into a central portion 56 and two outer portions 58 and 60 on opposite sides of the central portion 56.

It will be readily seen that with the central portion 56 placed atop of a core 20 or a peripheral portion thereof the portions 58 and 60 can be folded along the sides of the core in the manner indicated by the arrow in FIGURE 2 such that the insulating device forms a U-shaped element which straddles the core. Moreover, it is to be noted that if the walls 44 are of a height which is substantially equal to one-half the width or thickness of the associated core 20 that the walls 44 will abut or approach quite closely along the central longitudinal plane of the core so as to form a substantially closed sheath of insulating material. Ths sheath will be rigidly held in position when a coil 24 is applied and in turn will rigidly support the coil 24 relative to the associated core 20 in the most favorable predetermined position.

Figure 7:
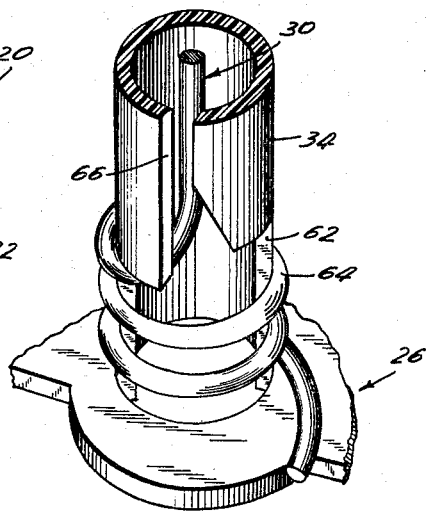
FIGURE 7 is a partial view, in perspective, of a typical terminal post provided for a terminal portion of the coil of FIGURE 1.

Reference is next made to FIGURE 7 in which is illustrated one type of terminal post 34 provided in accordance with the teachings of the invention. In FIGURE 7 are seen the previously identified elements including the insulating device 26, the terminal posts 34 connected to or integral with the insulating element 26 and the terminal portion 30 which constitutes one of the ends of a coil 24.

The terminal post 34, as was noted above, is a hollow tubular member. It defines a notched portion 62 opening into the bore of the hollow tubular member and serving to accommodate one or more turns 64 of the terminal portion of the coil. The post 34 can moreover be provided with a longitudinal slot 66 which facilitates an expansion of the hollow tubular member or post 34 which in turn facilitates the insertion of the coil wire or, if desired, to accommodate a double thickness of the coil wire when the terminal portion 30 is looped back upon itself as will be seen in greater detail in the following description.

It suffices to know at this point that the winding of the terminal portion 30 around the post 34 and particularly in the notched portion 62 provides an anchoring of the terminal portion 30 which will prevent forces applied to the outermost extremes of the terminal portion 30 from being transmitted back to the body of the coil which is thereby protected against displacement. Moreover, it will be noted and later seen in greater detail that the guiding of at least part of the terminal portion 30 through the bore of the hollow post 34 spaces the loose end of the terminal portion 30 from the body of the coil and from the associated core in such a manner as to prevent interference therebetween.

FIGURES 8 and 9 which are sectional views of a terminal post 34 illustrate one form of arranging the terminal portion of a coil in accordance with the structure suggested in FIGURE 7. In FIGURES 8 and 9, it is seen that a terminal portion 30 after being wound around the notched section 62 of a post 34 is led through the interior of the hollow tubular member 34 and extends outwardly therefrom. Thereafter the terminal portion 30 is doubled back on itself in the form of a flattened loop defining at its outer extremity a substantially circular portion 68 which is adapted to accommodate an eyelet 50 such as has been previously noted. The double thickness of the terminal portion 30 is readily accommodated within the terminal post 34 by virtue of the longitudinal slot 66 provided therein. This terminal portion arrangement is therefore constructionally strong as well as being firmly guided away from the region in which it might cause interference with the associated core or coil.

Before the eyelet 50 is welded or otherwise affixed to the circular portion 68, the insulating sleeve 48 is slid along the flattened loop and over the tapered portion 46 of the post 34 and further along the body of this post 34. The eyelet 50 is then welded in position on the circular portion 68 and an extremely strong and firmly positioned terminal arrangement is thus provided which by virtue of the turns 64 completely prevents the transmission of tensile or pulling forces applied at the circular portion 68 from being transmitted to the body of the associated coil.

In FIGURES 10–13 is illustrated a further embodiment of a terminal arrangement provided in accordance with the invention and it is seen in these figures that a terminal post 34a is provided which defines a notched section 62a for the accommodation of one or more turns 64a of a terminal portion 30a. In this instance, however, the notched section 62a does not open into the interior of the post 34a which is only partially hollow by virtue of having a blind bore 68' terminating in a cone-like recess 70 that is to receive the end of the coil wire. In this embodiment, one or more turns 64a are provided in the terminal portion of the coil for engaging the notched portion 62a whereupon the previously described anchoring is effected. The terminal portion 30a extends upwardly along the exterior of the post 34a via branch 30b which at the circular portion 68a doubles back into branch 30c to form a flattened loop, the branch 30c of which is received within the bore 68' in which branch 30c can extend as far as the recess portion 70. With the flattened loop formed and with the branch 30c in position in the bore 68', an insulating sleeve is then positioned over the flattened loop and extended down along the post 34a in a manner similar to that previously described whereupon the arrangement can be completed by welding or otherwise affixing an eyelet 50 to the circular portion 68a.

As has been stated above with respect to posts 34, it will be readily appreciated that, in addition to providing for the guidance and support of the terminal portions of the coil 24, these posts also supplement the function of the arcuate walls 40 and the wall 44 in maintaining an associated coil in position. In this regard, it is to be noted that the turns 64 and 64a described above anchor the terminal portions of the coil 24 and thereby anchor those portions of the coil 24 which lead into the turns 64 and 64a. As a result, the coils 24 are very firmly anchored in position.

It is to be furthermore noted that although each of the illustrated embodiments of the terminal arrangement provided in accordance with the invention has included the provision of a flattened loop, there will be some cases in which this additional strength and structure is not required, whereupon the doubling back can be omitted and the terminal portion of a coil terminated at an eyelet 50 provided at the outer extreme of the terminal portion of the coil.

With regard to the above description, it will be noted that the arrangements provided in accordance with the invention provide for full insulation between a core and its associated coil or coils. To those skilled in the art, it will be apparent that the structure is particularly suited for stators in which field coils are directly wound on the associated core because the folding feature of the insulating device permits ready assembly on a stator core from an external direction and the insulating devise is retained in position during field coil winding. Moreover, it is to be noted that the terminal posts eliminate the need for a separate field coil tie-down.

The terminal posts which have been described in some detail advantageously provide for guiding the terminal portions of a coil as well as an anchoring and strain relief means in the manner indicated above. The fact that the terminal posts are hollow permits the posts to serve as housing as well as anchorage means and provides for accommodating the loose ends of coil wire which are doubled back for purposes of providing structural strength.

The fact that terminal posts have been described in some detail relative to insulating devices provided in accordance with the invention does not detract from the utility of the insulating devices themselves. In fact, it will be clear from the description which follows that the insulating devices possess many features which are independent of the use of terminal posts. These features are shared in common by various types of insulating devices which the invention contemplates and which will next be described with reference to FIGURES 14–27, in which are illustrated various further embodiments of the invention.

In FIGURES 14–18 is illustrated a further coil and core arrangement provided in accordance with the invention, with an insulating device which both insulates the coil from the core and supports the coil on the core in a predetermined favorable position.

In these figures, a core 72 is provided, which is substantially circular in shape and defines a central opening 74. The core 72 consists of a plurality of laminations 76 bound together in conventional manner. In this instance, the core 72 is further provided with two diametrically opposed concave recesses 78 and 80. The purposes of the concave recesses 78 and 80 will become hereinafter apparent.

As with the coil and core arrangement previously described, it is intended that a coil such as the coil 82 be arranged within the central opening 74 with coil portions 84 and 86 (see FIGURE 16) extending transversely of the core 72 against the inner face thereof. The core 72 and the coil 82 have substantially equal degrees of curvature so that the general configuration of the coil 82 is that of a segment of a circle.

In order to support the coil 82 on the core 72 in the manner indicated above, there is provided an insulating device 88. The insulating device, as best seen in FIGURE 15, consists of two separate and independent members 90 and 92 which can be cooperatively associated, as will be indicated, to constitute a unitary insulating element.

The insulating device or cover 88, of which there are two for purposes of supporting two separate coils, defines two U-shaped recesses 94 and 96. With reference to the member 90 of the insulating device 88, there are provided, extending from the recesses 94 and 96, two U-shaped extensions, walls or flanges 98 and 100.

As is evident from the lower coil in FIGURE 14, the U-shaped recesses and walls serve to receive the associated coil in nesting relationship. However, if no further precaution were to be taken, the coil would be free to leave its accommodations on the associated insulating device, which would be both undesirable and dangerous.

In order to maintain the coil 82 in its proper relationship to the insulating device 88 and thus in proper relationship to the core 72, there are provided on the insulating device 88 a further wall or outward extension 102 on the member 90 and a further wall 104 or outward extension on the member 92. Both of these further walls have the configuration of segments of a circle so as to conform to the configuration of the associated coil. The walls 102 and 104 extend outwardly of the insulating device 88, whereas the walls 98 and 100 extend inwardly of the insulating device 88 so as to extend through the opening 74 of the core 72.

The insulating device 88 is provided with terminal posts 106 and 108, which terminal posts can be one of the types described above and these posts support the terminal portions 110 and 112 of the associated coil in a manner such as has already been described. There has also been described above the provision, in an insulating device, of raised sections such as the sections 114 and 116 to accommodate bolts or other types of protuberances on the core 72.

In accordance with the embodiment of the invention now being considered, a central outer portion of each of the members 90 and 92 of the insulating device 88 is provided with concave portions 118 and 120, which are positionable in one of the concave recesses 78 or 80 of the core 72. The walls of portions 118 and 120 have vertical flanges or lugs 122 and 124, respectively, in which are provided apertures 126 and 128. These apertures are intended to accommodate a rivet 130 which may be either of a metal or of a synthetic material such as nylon. It is the function of the rivet 130 to engage the flanges or lugs 122 and 124 and thereby operatively associate the members 90 and 92 so as to constitute a unitary insulating device 88.

The thickness or width W (see FIGURE 15) of the core 72 is substantially equal to the corresponding dimension L of the flanges 98 and 100. Consequently, with the rivet or bolt 130 engaging lugs 122 and 124, the flanges 98 and 100 extend completely through the central opening 74 of the core 72 so as to meet the depending wall 132 of the member 82. In a preferred form of this embodiment of the invention, the U-shaped walls 98 and 100 may be provided with lips such as the lip 134 (see FIGURE 15) which engages in an accommodating recess in the depending wall 132.

It will be evident from what has been stated above that an insulating device has been provided consisting of at least two parts which cooperatively engage the outer periphery of the core 72 and particularly concave recesses provided therein. Moreover, the insulating device consists of two depending walls engaging the side faces of the core 72, on at least one of which is provided U-shaped flanges extending through the central opening of the core and providing accommodations for receiving a coil to be mounted therein.

It will thus be noted that the insulating device 88 of FIGURES 14–18 shares in common many of the features of the insulating device previously described, there being the chief distinction that the insulating device 88 is provided in separate sections having flanges or lugs which are engageable by means such as a bolt or rivet to effect an engagement of the separate parts. It is also to be noted that the two forms of insulating devices which have been described also have in common the provision of the extensions or lugs 136 and 138, the purpose of which is to accommodate coil expansion, as will subsequently be indicated in greater detail.

The invention also contemplates the provision of an insulating device consisting of three parts and of an insulating device wherein the U-shaped flanges 98 and 100 of FIGURES 14–18 are supported on different components of the insulating device. The feature of providing an insulating device made of separate sections is intended for purposes of facilitating assembly and the feature of providing the U-shaped walls on different members of the insulating device is intended to facilitate manufacture of the insulating device, such that identical members can serve as both of the above noted depending walls.

In FIGURES 19–23 is illustrated a further coil and core arrangement utilizing an insulating device provided in accordance with a further embodiment of the invention. The insulating device 140 (see, for example, FIGURE 19) consists of three separate elements 142, 144 and 146 (see FIGURE 20). It is intended that the elements 142 and 144 be engaged through the intermediary of the element 146 so as to provide an insulating device to which inures all of the benefits shared by the insulating devices described above.

To this end, a coil 148 is mounted on a core 150 in the central opening thereof, the core 150 being generally circular and defining a central opening in which coils such as the coil 148 are to be mounted, and the core 150 in this instance having diametrically opposed flat faces 152 and 154 (see FIGURE 19) on the core's outer periphery. As is known from the above description, the insulating device 140 is provided with inwardly directed U-shaped flanges 156 and 158. These U-shaped flanges are, however, respectively mounted on the elements 142 and 144, in accordance with this further embodiment of the invention. The other portions of the insulating device, except as will be described below, are similar to corresponding elements of the preceding embodiments. Consequently, these have not been assigned reference numerals in FIGURES 19–23 and their function can be determined by referring back to the description of FIGURES 1–18.

The distinguishing feature of the embodiment of the invention now under consideration is the providing of an insulating device in three separate parts as well as the specific means relating to the engagement of these parts.

To this end, there are provided on the elements 142 and 144, respectively, flanges or lips 160 and 162, which each define a trough or guide slot 164 or 166. For engaging in these slots, the element 146 is provided, at both of its lateral extremities, with flanges or lips 168 and 170, the shapes of which are identical and intended to engage the lips 160 and 162 of the elements 142 and 144.

For purposes of mounting this latter insulating device on the core 150, the elements 142 and 144 are positioned against the side faces of the core 150 and the U-shaped walls 156 and 158 extending through the central opening of the core towards the depending wall of the opposite element. With the elements 142 and 144 properly positioned and aligned, the element 146 is moved with a sliding motion along the outer periphery of the core 150 in such a manner that the lips 168 and 170 are accommodated in the slots 164 and 166. With the element 146 thus engaged in the slots 164 and 166, the various elements are integrated to constitute an insulating entity 172 as shown, for example, in FIGURES 19, 21 and 22.

As noted above, one of the advantages of providing an insulating device in two or more sections is the facilitating of the assembling of the insulating device with an associated core. For example, if a core has a substantial width or thickness and its central opening is small relative to the core's thickness, the size of the U-shaped flanges required to extend completely through the central opening might very well preclude the possibilities of using a hinge-like structure as discussed above. The providing of an insulating device in separate sections makes it possible to insert the U-shaped flanges in a substantially lateral direction relative to the core so that it will always be possible to utilize one of the types of insulating devices which have been described, despite the relative proportions of the core and its central opening.

Moreover, it is to be appreciated that cores are generally constituted by laminations, the sizes of which will necessarily vary within predetermined tolerances. The providing of an insulating device in separate sections is advantageous in connection with these tolerances since the resulting insulating device will be able to accommodate readily variations in the width or thickness of a core.

Certain of the features of the invention cannot be properly understood without understanding the manner in which a coil is wound on a pole piece of a stator core in the manner contemplated by the invention.

To this end, there is illustrated in FIGURES 24–27 a tool or jig which, in accordance with the invention, provides important improvements with regard to providing coil and core assemblies. The tooling illustrated permits two coils to be wound, either simultaneously or separately, directly upon insulating devices mounted on a core in a manner as has been described. Moreover, the invention contemplates that coils, after being wound, are likely to expand to some degree and the invention makes provision for accommodating this expansion without in any manner permitting the coil or coils to escape from the associated insulating device or devices.

Figure 5:
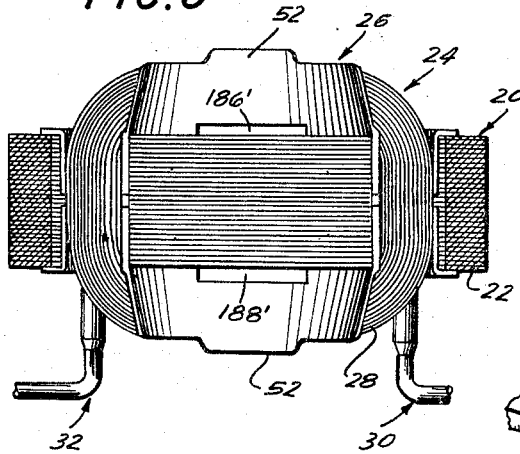
FIGURE 5 is a horizontal cross-section taken along line 5—5 of FIGURE 1.

The portion of the tool or jig shown in FIGURE 27 consists generally of a body 174 having a central portion 176 which engages the faces of the poles upon which the coils are to be wound. On the body 174 are mounted two lugs or walls 178 and 180 which are intended to straddle the core and to hold an insulating device 182 securely in position against a core 184 (see FIGURE 24). The lugs 178 and 180 pass through slots arranged in the insulating device which are similar to the slots or notches 186' and 188' in FIGURE 5. The notches 186' and 188' in FIG. 5 are formed in the arcuate walls 40 by the openings 186 and 188 (see FIGURE 6) in the spaced apart side walls 58 and 60 of the insulating member which overlie the end faces of a pole piece. By providing such openings in which the lugs 178 and 180 are disposed, the lugs are in physical contact with the end faces of the pole, as illustrated in FIG. 25. Hence, the outer surfaces of the lugs 178 and 180 in FIG. 24 are flush with the outer surfaces of the spaced parallel wall sections of the insulating member 182 and the raised or elevated portions 138' are at a higher level than the outer surface of the lug 178. Accordingly, when the coil is being wound on the magnetic field structure 184, the turns of the coil overlie the outer surfaces of the parallel sides of the insulating member 182 and the lugs 178 and 180 can be withdrawn from the cut-away portions of the parallel sides of the insulating member in which they are seated.

Integral with the body 174 are the sections 190 and 192 which have curved surfaces and can be generally considered as being spherical. The portions 190 and 192 each define a groove 194 or 196 and include flat wall portions 198 and 200. The central portion 176 is moreover depressed, relative to two adjacent and bordering shoulder sections 202 and 204, the distance between which accommodates the thickness of the core with the insulating device 182 thereupon.

As best seen in FIGURES 24–26, two jigs such as indicated in FIGURE 27 are placed in diametrically opposed positions relative to the core 184. The inside surfaces of the tools define concave recesses, such as the recess 206 in FIGURE 24, for purposes of accommodating a coil-wire feeding device which passes through the opening defined by the concave recesses. Recesses 194 and 196 accommodate lugs or extensions of the insulating device such as the extension 52 shown in FIGURE 4. The accommodation of these extensions enables the curved outer walls (see elements 40 of FIGURE 4) of the insulating devices to abut the walls 198 and 200 of the tool which thereby delimit, together with the side faces of the core and shoulders 202 and 204, a trough in which the coil can be wound.

The coil wire which is fed from inside the tool by a feeding mechanism (not shown) is passed around one or the other of the spherical portions 190 and 192, the shape of which facilitates the feeding of the coil wire, and is intertwined in the troughs noted above and in the U-shaped walls which are included in each of the above described embodiments. When the coils have been completely wound, the tool members are withdrawn. The first tool 174 to be removed from the magnetic field structure 184 is moved from its solid line to its dotted line position in FIG. 26 until the lugs 178 and 180 are clear of the concave-shaped pole face. Since the enlarged ends 190 and 192 of the tool 174 project outwardly the same distance as the lugs 178 and 180, as seen in FIG. 25, the tool can be moved endwise from its dotted line position in FIG. 26. Any tendency of the coil to expand in direction X (see FIGURE 24) is, of course, negated by the U-shaped recesses. Any tendency of the coil to expand in direction Y, when the tools are withdrawn, is permitted and is accommodated by the aforenoted extensions (see, for example, extension 52 in FIGURE 4 and extension 136 in FIGURE 15, these extensions being accommodated in recesses 194 and 196). It is the provision of these extensions and the manner in which the coil is wound that avoids the necessity for separate "coil tie-down" which has previously plagued manufacturers. "Coil tie-down" requires that a coil, once applied to the core, be fastened thereto by means of a separate engaging means such as a string or the like, this additional and disturbing operation being avoided in accordance with the teachings of the invention. By providing notches 178' and 180' at the outer ends of the lugs 178 and 180 which are clear of the insulating member 182, as seen in FIG. 24, the tools 174 can be detachably connected to suitable supports for the coil winding operation.

In summary, the invention has provided for insulating devices capable of presenting integral terminal posts and which permit the rigorous supporting of a coil in the central opening of a substantially circular core. The insulating devices of the invention provide effective insulation by actually enveloping a core section in the manner of a sheath while at the same time permitting coil winding operations directly on cores. Additionally, the invention makes provision for accommodating coil expansion and provides for negating mechanical pulling forces which tend to dislodge coils from predetermined positions on associated cores. Further, the invention provides for accommodating tolerances in the various dimensions of cores and provides for simplified coil and core constructions. Various other objects and advantages of the invention have been noted above.

There will now be obvious to those skilled in the art many modifications and variations of the coil and core structure set forth, which modifications and variations do not depart essentially from the spirit of the invention as defined in the following claims.

What is claimed is:

1. In a dynamo-electric machine, a magnetic field structure of annular form having a yoke and inwardly extending pole pieces which terminate in concave-shaped pole faces defining a bore adapted to receive a rotor, each of the pole pieces having leading and lagging pole tips which are spaced from the yoke to provide wall surfaces defining spaces, the pole pieces having field coils including first portions in the spaces and second portions intermediate the first portions which project beyond the end faces of the magnetic field structure, means for insulating the coils from the magnetic field structure, the last-mentioned insulating means comprising an insulating member for individually insulating the coil provided on one of the pole pieces from the magnetic field structure, the insulating member being of U-shape and including spaced first wall sections forming the parallel arms of the U and overlying and in intimate physical contact with the opposing end faces of the magnetic field structure to insulate the second portions of the coil therefrom, a second section joined to the first wall sections and overlying and in intimate physical contact with the outer periphery of the magnetic field structure, third wall sections substantially perpendicular to the first wall sections which overlie and are in intimate physical contact with the wall surfaces defining the spaces to insulate the first portions of the coil from the magnetic field structure, the third wall sections being carried by at least one of the first wall sections, and the first wall sections having insulating guards projecting axially of the magnetic field structure from the opposing end faces thereof at the vicinity of the concave-shaped face of said one pole piece, the insulating guards cooperating with the first wall sections to hold the second portions of the coil at the vicinities of the first wall sections.

2. Apparatus as set forth in claim 1 in which the insulating guards provide surfaces which are concave-shaped and extend between the leading and lagging tips of said one pole piece and provide an axially extending projection of the concave-shaped face of said one pole piece with substantially the same curvature as the latter.

3. Apparatus as set forth in claim 2 in which the concave-shaped surfaces provided by the insulating guards include regions intermediate the leading and lagging tips of said one pole piece that project axially from the end faces of the magnetic field structure for a greater distance than regions of the concave-shaped surfaces at each side of the intermediate regions thereof.

4. Apparatus as set forth in claim 1 in which the first, second and third wall sections of the insulating member are formed integrally with one another and the insulating guards are formed integrally with the first wall sections of the member, the first wall sections being bendable with respect to the second wall section.

5. Apparatus as set forth in claim 4 in which a part of each of the third wall sections of the insulating member is carried by each of the first wall sections thereof, the parts of the third wall sections respectively carried by the spaced first wall sections being substantially in abutting relation in the spaces in which the first portions of the coil are disposed.

6. Apparatus as set forth in claim 1 in which the third wall sections of the insulating member extend continuously from one end face to the opposite end face of the magnetic field structure.

7. Apparatus as set forth in claim 6 in which both of the third wall sections are carried by the same first wall section, the other first wall section being apertured to receive the outer free ends of the third wall sections.

8. Apparatus as set forth in claim 1 which includes means for detachably connecting the first and second wall sections of the insulating member.

9. Apparatus as set forth in claim 8 in which said detachable connecting means is constructed and formed to provide cooperating grooves on the first and second wall sections which form a separable slidable connection therefor.

10. Apparatus as set forth in claim 1 in which the magnetic field structure is of cylindrical form having a recess at its outer periphery extending between the opposing end faces thereof, the second wall section of the insulating member having a region which extends between the spaced first wall sections thereof and nests in the recess of the magnetic field structure, the insulating member being divided into two parts whereby said parts are movable axially toward one another into abutting relation with the third wall sections of the member extending from one first wall section to the opposite first wall section at opposing end faces of the magnetic field structure, and means at the vicinity of the recess at the outer periphery of the magnetic field structure for securing the parts of the insulating structure together.

11. In a dynamo-electric machine, a magnetic field structure of annular form having a yoke and inwardly extending pole pieces which are spaced apart and terminate in concave-shaped pole faces defining a bore adapted to receive a rotor, each of the pole pieces having leading and lagging pole tips which are spaced from the yoke to provide wall surfaces defining spaces, the pole pieces having field coils including first portions in the spaces and second portions intermediate the first portions which project beyond the end faces of the magnetic field structure, means for insulating the coils from the magnetic field structure, the last-mentioned means comprising insulating wall sections overlying the opposing end faces of the magnetic field structure to insulate the second portions of the coil therefrom, said coils comprising windings having end portions, means for anchoring at least one coil end portion, the anchoring means comprising an insulating post carried by one of the wall sections and projecting from the magnetic field structure, the post being notched at a region removed from its outer free end, the coil end portion, at a region removed from its extreme end, being disposed about the one post at the notched region thereof and extending lengthwise of the post from the notched region to the outer end thereof, an insulating sleeve for the coil end portion, a part of the sleeve being disposed over the section of the coil end portion extending lengthwise of the post.

12. Apparatus as set forth in claim 11 in which the post is formed with an elongated opening from the outer end thereof toward its notched region, at least a part of the coil end portion being disposed in the elongated opening.

13. Apparatus as set forth in claim 11 in which the post is hollow from the outer end thereof toward its notched region, at least a part of the coil end portion being disposed within the hollow post, the wall of the post having an elongated slit to facilitate insertion of the coil end portion in the hollow post.

14. Apparatus as set forth in claim 12 in which the part of the coil end portion in the elongated opening of the post includes one portion extending from the notched region of the post to the outer end thereof and also the extreme end of the coil end portion, the coil end portion being bent along its length and including a section returning through the hollow sleeve back to the post.

15. Apparatus as set forth in claim 11 in which the coil end portion extends lengthwise of the post at its outer surface from the notched region to the outer end thereof, the part of the insulating sleeve extending lengthwise of the post being disposed over the section of the coil end portion at the outer surface of the post.

16. Apparatus as set forth in claim 15 in which the post is formed with an elongated opening from the outer end thereof toward its notched region, the extreme end of the coil end portion being disposed in the elongated opening of the post, the coil end portion being bent along its length and including a section returning through the hollow sleeve back to the post.

17. In combination, a magnetic field structure of annular form having a yoke and inwardly extending pole pieces which terminate in concave-shaped pole pieces defining a bore adapted to receive a rotor, each of the pole pieces having leading and lagging pole tips which are spaced from the yoke to provide wall surfaces defining spaces, insulating means comprising an insulating member of U-shape at the vicinity of one of the pole pieces and including spaced first wall sections forming the parallel arms of the U and overlying the opposing end faces of the magnetic field structure, a second section joined to the first wall sections and overlying the outer periphery of the magnetic field structure at the region of said one pole piece, and third wall sections substantially perpendicular to the first wall sections which overlie the wall surfaces defining the spaces, the third wall sections being carried by at least one of the first wall sections, the first wall sections having elements projecting axially of the magnetic field structure from the opposing end faces thereof at the concave-shaped face of said one pole piece, the last-mentioned elements providing surfaces which are concave-shaped and extend substantially between the leading and lagging tips of said one pole piece and provide an axially extending projection of the concave-shaped pole face of said one pole piece with substantially the same curvature as the latter, the first wall sections having openings which extend from the outer periphery of the magnetic fields structure to the elements to notch the latter, and means for winding a field coil about said one pole piece which includes a tool adapted to be positioned within the yoke, the tool having spaced parts projecting therefrom which extend through the notches and are in physical contact with the end faces of the magnetic field structure at the openings in the first wall sections.

18. Apparatus as set forth in claim 17 in which the projecting spaced parts of the tool are constructed and formed to be detachably connected to a support.

19. Apparatus as set forth in claim 18 in which the tool includes an intermediate narrow portion and enlarged end portions, the spaced parts of the tool projecting from the intermediate portion, the enlarged end portions of the tool being spaced from the end faces of the magnetic field structure to provide gaps therebetween adapted to receive parts of the coil adapted to be wound on said one pole piece, the elements projecting from the end faces of the field structure forming bottoms of the gaps, and the enlarged end portions being formed and shaped to facilitate winding the coil on said one pole piece.

20. Apparatus as set forth in claim 19 in which the field structure comprises a pair of opposing pole pieces, the aforementioned tool cooperating with said one of the pole pieces and insulating member thereon, and a second tool similar to the aforementioned tool cooperating with the other pole piece and another insulating member which is similar to the aforementioned insulating member, the tools being disposed back to back within the yoke.

References Cited in the file of this patent
UNITED STATES PATENTS

| | | |
|---|---|---|
| 1,261,193 | Van Deventer | Apr. 2, 1918 |
| 2,232,812 | Studer | Feb. 25, 1941 |
| 2,383,019 | Sigmund et al. | Aug. 21, 1945 |
| 2,445,986 | Adamson | July 27, 1948 |
| 2,688,103 | Sheldon | Aug. 31, 1954 |

FOREIGN PATENTS

| | | |
|---|---|---|
| 759,960 | Great Britain | Oct. 24, 1956 |